United States Patent [19]

Becker et al.

[11] Patent Number: 5,572,178
[45] Date of Patent: Nov. 5, 1996

[54] ROTARY TRANSFORMER

[75] Inventors: Richard J. Becker; Michael J. Douglass, both of Oxford, N.Y.; David B. Sweet, Canal Fulton, Ohio

[73] Assignee: Simmonds Precision Products, Inc., Akron, Ohio

[21] Appl. No.: 197,776

[22] Filed: Feb. 16, 1994

Related U.S. Application Data

[63] Continuation-in-part of Ser. No. 982,202, Nov. 25, 1929, abandoned.

[51] Int. Cl.⁶ .................................................. H01F 21/06
[52] U.S. Cl. ........................... 336/120; 336/132; 336/234
[58] Field of Search ........................... 236/120, 178, 236/117, 119, 132, 234

[56] References Cited

U.S. PATENT DOCUMENTS

| | | | |
|---|---|---|---|
| 3,441,887 | 4/1969 | Costa | 336/120 |
| 3,535,618 | 10/1970 | Perrins | 323/50 |
| 4,321,572 | 3/1982 | Studer et al. | 336/83 |
| 4,323,781 | 4/1986 | Baumann et al. | 250/422 |
| 4,675,638 | 6/1987 | Szabo | 336/83 |
| 5,233,324 | 8/1993 | Beinhoff et al. | 336/83 |

FOREIGN PATENT DOCUMENTS

| | | |
|---|---|---|
| 863490 | 1/1941 | France . |
| 2234472 | 1/1974 | Germany . |

OTHER PUBLICATIONS

Patent Abstracts of Japan, vol. 12, No. 225 (E–626)(3072) Jun. 25, 1988 and JP–A–63 018 610 (Victor Co. of Japan)–abstract.

NTIS Technical Notes vol. B, No. 3, Mar. '86, Springfield, p. 281. W. McLyman et al. "Rotary Power Transformer and Inverter Circuit".

*Primary Examiner*—Laura Thomas
*Attorney, Agent, or Firm*—Carl A. Rankin; Richard A. Romanchik

[57] ABSTRACT

A rotary transformer for aircraft deicing apparatus, the transformer including a primary winding adjacent a laminated primary core, and a secondary winding adjacent a laminated secondary core; at least one of the cores being rotatable with respect to the other core.

34 Claims, 4 Drawing Sheets

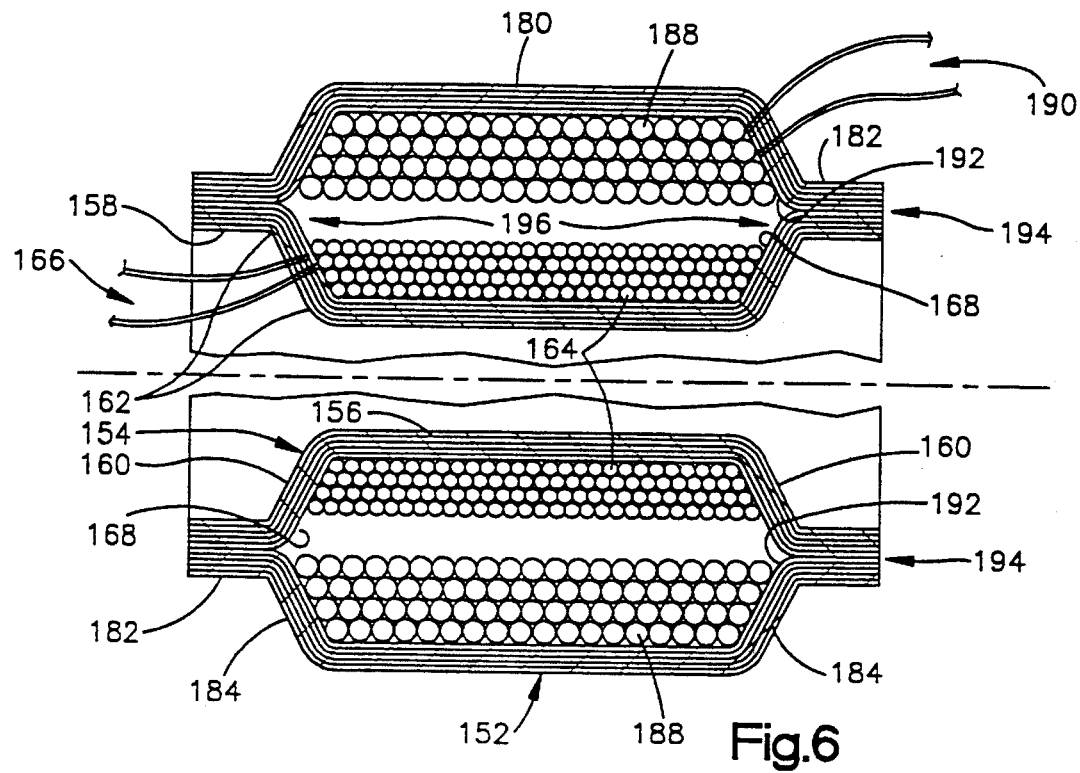
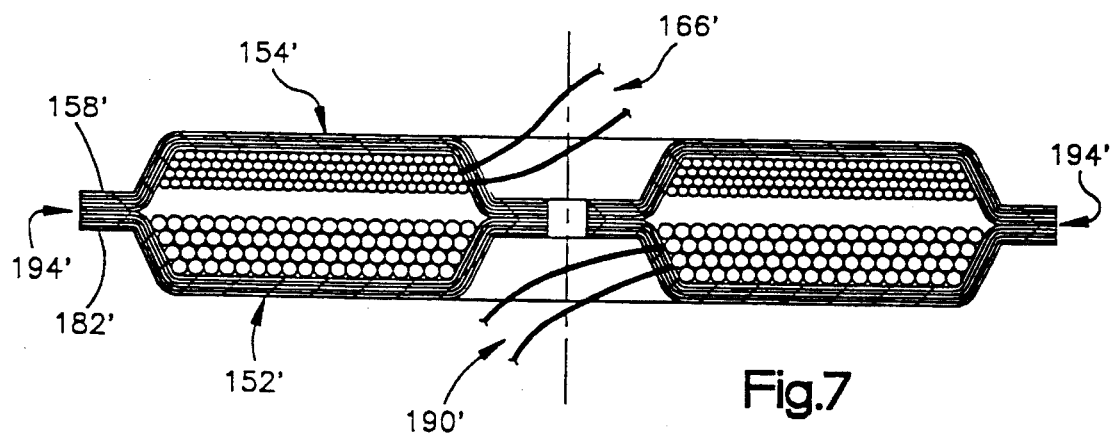

ROTARY TRANSFORMER

This application is a continuation-in-part of application Ser. No. 07/982,202, filed Nov. 25, 1992 now abandoned.

BACKGROUND OF THE INVENTION

The invention relates to rotary transformers.

Aircraft deicing is an important safety consideration. In addition to the apparent need to deice the wings and leading edges of the various airfoil surfaces, many aircraft also provide for deicing the propellers for conventional prop engines and/or turboprops. Deicing the propeller blades presents a particularly challenging design approach due to the propeller rotational speeds and hostile environmental conditions.

A known deicing technique involves the application of high energy impulses to the airfoil or propeller surface. These high energy impulses can be, for example, pneumatic, hydraulic or electro-motive or a combination thereof. Regardless of the type of force applied to the surface to be deiced, electrical energy pulses are usually needed for impulse deicing of propellers. In addition to impulse deicing, propellers are commonly deiced with thermal deicing systems. The electrothermal systems do not necessarily require short duration electrical pulses, but may require energy transfer on the order of 3000 watts, for example.

The main power source for aircraft deicing systems is the aircraft engine power plant. A device is needed to couple the electrical energy from the engine to the high speed rotating prop. Conventional systems use brush and/or slip-ring assemblies to achieve the rotary power coupling. But, such apparatus tend to exhibit mechanical wear of the brushes and rings. Thus these assemblies require costly down time for repair, maintenance or replacement of the brush/slip-ring assembly.

The need exists, therefore, for a rotary electrical power coupling device that is low maintenance and has weight and size parameters suitable for aircraft deicing systems. In a more general sense, the need exists for a rotary transformer that is lightweight and small yet is capable of coupling high energy and power between rotating and stationary cores.

SUMMARY OF THE INVENTION

In response to the aforementioned needs, the present invention contemplates a rotary transformer that can be used, for example, to couple electrical energy to a rotating prop assembly for deicing. In a preferred embodiment, such a transformer includes a primary winding adjacent a laminated primary core, and a secondary winding adjacent a laminated secondary core; at least one of the cores being rotatable with respect to the other core.

These and other aspects and advantages of the present invention will be understood and appreciated by those skilled in the art from the following detailed description of the preferred embodiments as the best mode contemplated for practicing the invention in view of the accompanying drawings.

BRIEF DESCRIPTION OF THE DRAWINGS

FIG. 6 is a longitudinal section of an alternate form of radial rotary transformer embodying the invention; and FIG. 7 is a longitudinal section of another embodiment of the invention in the form of an axial rotary transformer.

DETAILED DESCRIPTION OF THE INVENTION AND PREFERRED EMBODIMENTS

Figure 1:
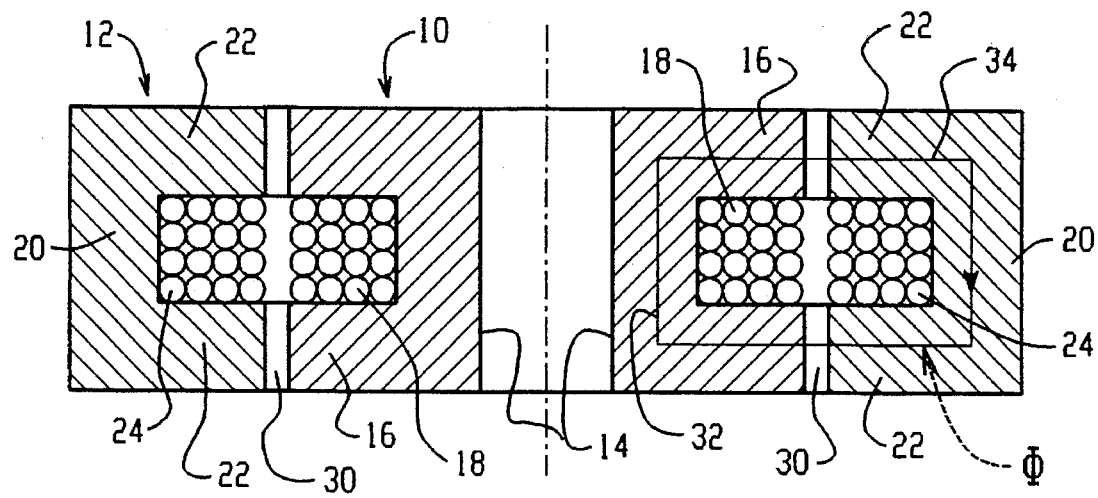
FIG. 1 is a simplified schematic in transverse section of a conventional cylindrical or radial rotary transformer.
Figure 2:
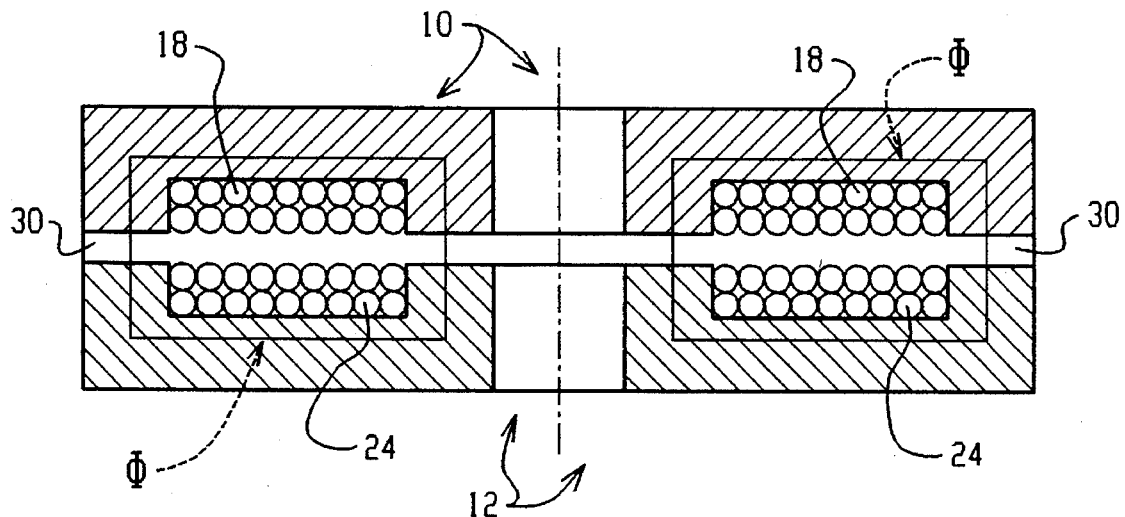
FIG. 2 is a simplified schematic in transverse section of a conventional axial or pancake rotary transformer.

With reference to FIGS. 1 and 2, the conventional rotary transformer designs illustrated in FIGS. 1 and 2 are generally of two types, namely cylindrical and pancake. The cylindrical design is illustrated generally in FIG. 1 and may also be referred to as a radial design. The pancake design is illustrated in FIG. 2 and may also be referred to as an axial design. For purposes of the present invention and disclosure, we will use the terms "radial" and "axial" hereinafter, there being no particular significance to a preference for such terminology other than for consistency and clarity.

The rotary transformer radial design generally consists of a first or inner core 10 and a second or outer core 12. The cores 10,12 are generally cylindrical in shape with the inner core being appropriately sized to fit axially and concentrically within the outer core. The inner core 10 typically includes an axially extended inner cylinder 14 integrally formed with or attached to doughnut shaped inner endcaps 16 on opposite ends of the cylinder 14. The endcaps 16 extend radially outward from the longitudinal centerline axis $\mathcal{C}$. An inner core multi-turn winding 18 is wrapped around the inner cylinder 14 between the endcaps 16. The inner winding 18 can function as the primary or secondary winding of the rotary transformer as is well known in the art.

The outer core 12 includes an axially extended outer cylinder 20 that is integrally formed with or attached to doughnut shaped outer endcaps 22. The endcaps 22 extend radially outward from the longitudinal centerline axis $\mathcal{C}$. An outer core multi-turn winding 24 is wrapped within the outer cylinder 20 between the endcaps 22. The outer winding 24 can also function as the primary or secondary winding of the rotary transformer.

The inner endcaps 16 fit concentrically within the outer endcaps 22 so that the inner core can freely rotate with respect to the outer core. In this manner, either the inner core or outer core can be fixedly attached to a rotating element for rotation about the centerline axis $\mathcal{C}$ therewith while the other core remains positionally fixed. Of course, the cores could also both be attached to rotating members.

In order to insure free relative rotation between the two cores, the outer diameter of the inner endcaps 16 is slightly less than the inner diameter of the outer endcaps 22. This arrangement provides an airgap 30 across which magnetic flux created by current in the primary winding induces a corresponding current in the secondary winding. The flux path is represented by the dashed lines designated with "Φ" in FIGS. 1 and 2. In both the radial and axial designs the flux paths include radial and axial components. In other words, referring to FIG. 1, the flux path between the primary and secondary windings includes axially aligned portions 32 and radial portions 34. In fact, substantially all of the flux crosses the airgap 30 in the radial direction.

For the moment, assume that the inner winding 18 is the secondary and that the outer winding is the primary, and further that the secondary core is the core rotated with respect to the outer core. When a current is supplied to the primary winding 24 by a supply (not shown), a magnetic flux is created and flows through the primary core 12 according to the right hand rule, assuming that the core is made of magnetically high permeability material such as ferrite or powder core materials. The flux in the primary core 12 crosses the airgap 30 and flows through the secondary core 10. Thus, the complete flux path is defined by the entirety of the primary and secondary cores. The flux in the secondary core 10 induces a current in the secondary winding, which can be connected to a load as needed. The current in the secondary winding closely matches the drive current in the primary. However, if desired, the transformer can be used to step-up or step-down the voltage on the secondary side by changing the number of turns in the secondary. This produces a proportional decrease or increase in the secondary current.

A well-constructed rotary transformer can achieve greater than ninety percent (90%) coupling efficiency between the primary and secondary windings. Furthermore, the transformer coupling is independent of the rotational speed of the moving core. That is, the electrical characteristics of the secondary output current are substantially independent of the relative rotation of the cores, and in fact will work without any rotation assuming a time variant input drive current is used.

In the axial design of FIG. 2 (wherein like reference numerals are used for like parts in FIG. 1), rather than having two cores that are concentrically aligned on a common axis, the first core 10 is axially spaced from the second core 12 along the common longitudinal axis $\mathbb{C}$. Again, which core serves as the primary and which serves as the secondary, as well as which is rotationally driven, are all matters of design choice. As shown in FIG. 2, the flux path still has both axial and radial components, but substantially all the flux crosses the airgap 30 in the axial direction.

The conventional rotary transformers illustrated in FIGS. 1 and 2 have specific design features that render them unsuitable for aircraft deicing systems. First, because the flux path includes radial and axial components, the cores are made of ferrites or iron powder materials. This is necessary to insure high magnetic permeability in the cores without a flux directional bias. In other words, with ferrite, ferrous or powder cores, the flux permeability is the same for flux travelling axially or radially. However, if a ferrite or iron powder core rotary transformer were to be used for coupling the electrical energy required for propeller deicing, the transformer would have a weight that is unacceptably high for modern aircraft design. Such a transformer would also have an unacceptably large envelope, making it unsuitable for engine mounted applications.

Second, the efficiency of the conventional transformer depends on the size and uniformity of the airgap 30, as well as the axial alignment of the core endcaps. If the inner core were to be driven by an engine prop shaft, vibration and shaft axial displacement could result in substantial axial misalignment of the primary and secondary cores and/or change the size of the airgap. This would have the undesirable effect of substantially increasing the effective primary current and degrade the efficiency of the transformer.

We have discovered a rotary transformer design, however, that is suitable for aircraft rotary power transformation, and is particularly well suited for deicing systems due to its low weight and reduced sensitivity to axial misalignment. Our rotary transformer, of course, can be used in many different applications besides aircraft deicing where rotary power coupling is required.

Figure 3:
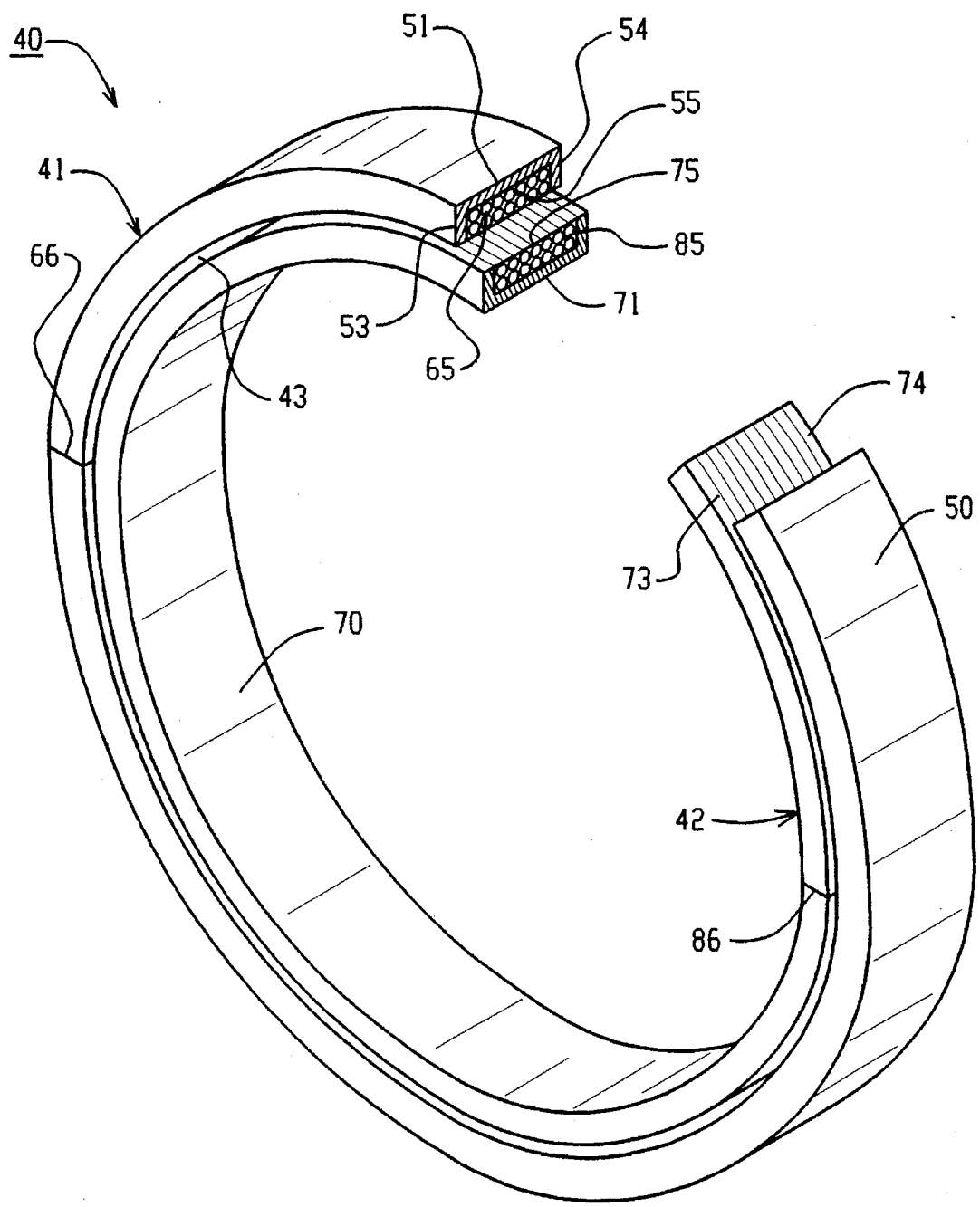
FIG. 3 is a perspective view of a rotary transformer embodying the invention with parts broken away for the purpose of illustration.
Figure 4:
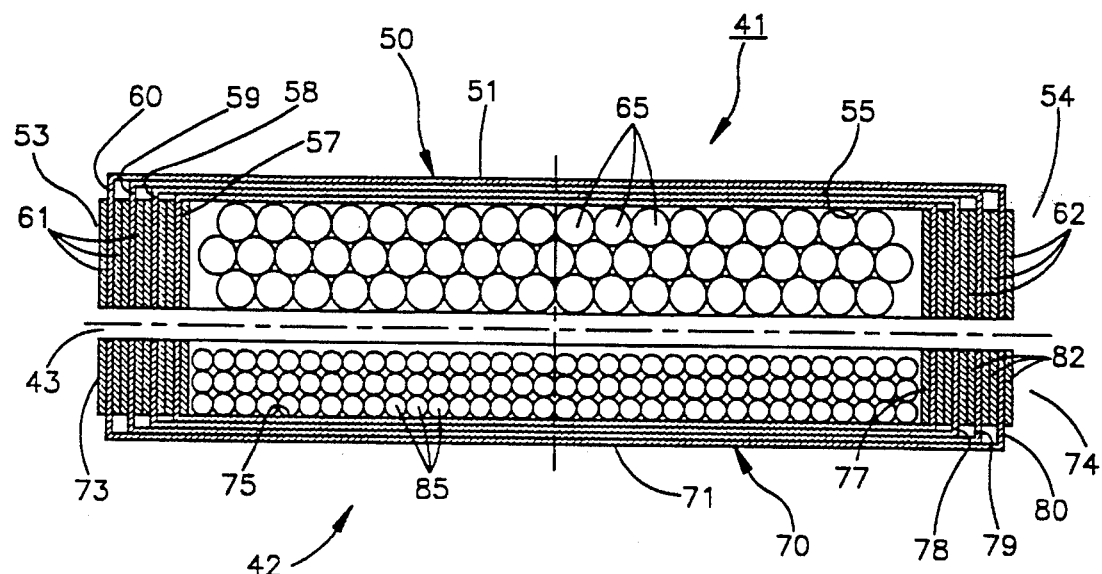
FIG. 4 is a fragmentary sectional view on an enlarged scale of the rotary transformer of FIG. 3.

Referring to FIGS. 3 and 4, there is shown a rotary transformer embodying the present invention and indicated generally by the numeral 40. The transformer assembly includes an annular outer member 41 and an annular inner member 42 located coaxially within the outer member and axially aligned therewith. The inner and outer members 41 and 42 are separated by an airgap 43 so that either may rotate freely relative to the other about their common axis. For the purpose of illustration only, it will be assumed herein that the inner member 42 serves as the rotor and that the outer member 41 serves as the stator. This, however, is intended for the purpose of convenience and ease of explanation, since either member can be rotated with respect to the other, although for higher speed operation, it may be desirable to rotate the smaller diameter inner core only.

Also, it will be assumed herein, that the outer member or stator 41 serves as the primary element of the transformer, and that the inner member or rotor 42 serves as the secondary element of the transformer. Here again, that will be merely for the purpose of illustration since either member can serve as the primary or secondary.

The outer member 41 comprises an annular outer core 50 that includes an axially extending cylindrical central span 51, and a pair of radially inwardly extending end portions 53 and 54 spaced at opposite ends of the central span 51. The axial thickness of each of the annular end portions 53 and 54 is approximately three times the radial depth of the central span. This provides certain unique advantages which will be described more particularly below.

The central span 51 and radially extending end portions 53 and 54 define an annular recess 55 that faces radially inward. The annular recess 55 is adapted to receive the primary windings as will be described below.

The outer core 50 is a laminated structure comprising a plurality of thin laminations. The laminations comprise four annular channel shaped members or hoops 57, 58, 59 and 60 that are adapted and sized to nest one within the other. The cylindrical portions of the hoops (which form the central span 51) are located with their surfaces adjacent one another, while the radial end flanges (which form a part of each end portion 53, 54) are axially spaced from one another as indicated in FIG. 4.

Each end portion 53 and 54 also has a plurality of annular spacer rings 61, 62, two of which are located between the adjacent radial end flanges of the hoops, and one of which is located axially outwardly of the outer most hoop 57 end flange and another of which is located axially inwardly of the inner most end flange of the hoop 60.

It will be noted that this same arrangement is used on each of the ends 53 and 54 of the outer core 50. Thus, the flux remains substantially within the core structure except where the flux crosses the airgap 43 to the inner member or rotor 42.

The laminations can be made of any suitable magnetically permeable material such as silicon iron, a nickel iron alloy such as Alloy 49, stainless steel or cobalt iron alloy, such as Vanadium Permendur, to name just a few. The particular material selected for the laminations will depend on such factors as the size and weight criteria that the transformer must meet, as well as core losses allowable, permeability required, formability of the material, cost and the type of power transfer required from the primary to the secondary winding and the efficiency needed. The laminations can be bonded together with Bondmaster® or other suitable adhesive.

A primary winding or coil 65 is positioned in the recess 55 and the lead wires therefrom can be used to access the primary winding after the rotary transformer is fully assembled and preferably potted. Preferably, a thin insulating layer such as Nomex®, for example, is provided between the primary winding and the primary or outer core 50.

The inner member or rotor 42 is constructed in a manner generally corresponding to that of the outer member or stator 41 except that its recess for the secondary windings faces radially outwardly toward the recess 55. The inner core 70 has a generally channel-shaped configuration with an axially extending cylindrical central span 71 that joins two radially outwardly extending end portions 73 and 74. The end portions 73 and 74 terminate at the gap 43 and are generally axially aligned with the end portions 53 and 54 of the outer core 50. The cylindrical span 71 and end portions 73 and 74 define a radially outwardly facing recess 75 adapted to receive the secondary windings as will be described below.

As in the case of the outer core 50, the inner core 70 is formed of a plurality of laminations to include four channel-shaped members or hoops 77, 78, 79 and 80 located coaxially and radially spaced one within the other. The central portions are adjacent one another, however, the end flanges are axially spaced as in the case of the outer core 50 described above. The end flanges are spaced uniformly by means of a plurality of annular spacer rings 81 and 82 including left side spacer rings 81 and the right side spacer rings 82. The eight end rings 81 are arranged with two located between the adjacent end flanges of the hoops with one located axially outwardly of the end flange of the hoop 77 and the other axially inwardly of the end flange of the hoop 80.

It will be noted that the axial thickness of each end portion 73 and 74 is approximately three times the radial thickness of the cylindrical span 71.

The secondary winding or coil 85 includes a plurality of convolutions located in the annular recess 75. The lead wires for the rotor windings 85 can be used to access the secondary windings after the transformer is fully assembled and preferably potted. Preferably, a thin insulating layer such as Nomex®, for example, is provided between the secondary windings 85 and the inner core 70.

As in the case of the outer core 50, the flux remains substantially within the inner core structure expect where it crosses the airgap 43. A typical airgap for an exemplary transformer would be approximately 0.070 in.

It is preferred that a "split core" type construction be used for both the outer core 50 and inner core 70 in order to minimize eddy current losses. Accordingly, both cores have a radial cut formed at any convenient angular position. In FIG. 3, the cuts are shown at 66 and 86 respectively.

With the rotary transformer assembled as described above, significant advantages are achieved by the unique construction of the end portions 53, 54, 73 and 74 of the inner and outer cores when the device is used in aviation applications. For example, when the inner core 70 is rotated by means of an aircraft engine drive shaft, vibration and axial displacement of the shaft can cause the inner core to shift axially with respect to the outer core. Because of the increased axial thickness of the end portions 53, 54, 73 and 74, an adequate airgap area is assured so that power transfer from the primary to the secondary will not be unacceptably degraded.

The core construction thus described is particularly effective in reducing the surface temperature by minimizing eddy current losses. By minimizing core surface temperatures (and thus thermal losses) during operation a higher operating efficiency can be achieved. Efficiency levels as high as 90% may be obtained with the present design using an airgap of 0.70 in.

Still another advantage of the construction of the end portions 53, 54, 73 and 74, is that they help spread the flux across a larger airgap area, thus reducing flux crowding which will tend to occur near areas where the flux will prefer to cross over the airgap 43.

It will also be apparent that the invention can be used advantageously in connection with an axial rotary transformer. In such a design, the respective rotor core and stator core would be located axially adjacent one another and separated by an airgap that extends at an axial dimension.

Figure 5:
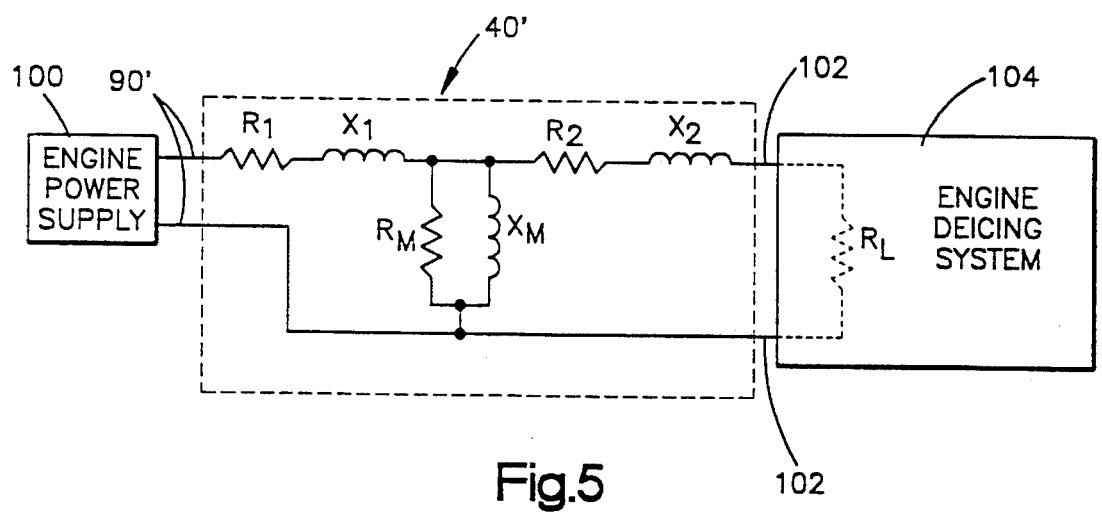
FIG. 5 is a simplified diagram of a rotary transformer according to the present invention used in combination with an aircraft deicing system.

With reference now to FIG. 5, a radial rotary transformer 40' according to the present invention is shown in combination with an aircraft deicing system. Thus, the outer primary winding which is stationary with respect to the secondary, is electrically connected by leads 90' to the aircraft engine power supply 100. The secondary core is attached to the drive shaft of the engine for rotation therewith, while the secondary winding is electrically connected by leads 102 to the deicing system circuitry 104. The engine power supply 100 provides the excitation current to the primary winding which induces a flux in the primary core of the transformer 40'. The flux crosses over the airgap to the secondary core and induces a current in the secondary winding that in turn supplies power to the deicing circuit 104. The deicing circuit is simply shown as a functional block because, as far as the transformer 40' is concerned, the deicing system is but one type of load that can be connected thereto. Thus, the deicing system may comprise a thermal deicing system that uses a steady supply of current to a resistive heater load or blanket. Such a system is shown, for example, in U.S. Pat. No. 4,386,749, the disclosure of which is fully incorporated herein by reference.

Other deicing systems could also be used of course, such as for example, electro-mechanical systems including pneumatic, hydraulic, electric impulse, eddy current and electro-expulsive. Such deicing systems are known as in U.S. Pat. Nos. 4,690,353; 4,875,644; 5,129,598 and 5,152,480, the disclosures of which are fully incorporated herein by reference. Also, pneumatic systems or hydraulic systems might use electrical solenoids within pneumatic or hydraulic valves on the rotating side which could be energized by pulses from the transformer.

It is important to recognize, however, that aircraft deicing systems are but one type of load that can be used with the transformer of the present invention, and such exemplary description herein should not be construed in a limiting sense. For example, in an electro-expulsive load, the rotary transformer may be used to charge a capacitive load to about 240 volts at about 300 watts. The rotary transformer of the present invention thus provides a lightweight and efficient rotary power transformation capable of operating at high power without mechanical wear, thus obviating the prior need for brush or slipping assemblies.

Several advantages over the older brush or slip-ring system are also achieved. By providing the ability to step-up or step-down the voltage on the secondary side, the choices of resistance wire used for electrothermal deicers is expanded. Brush and slip-ring systems are limited to aircraft electrical system voltage only.

Also, for either electrothermal or electro-mechanical systems, a wire harness must be used to transmit power to the deicers installed on or within the propeller blades. This harness must flex with the changing pitch angle of the propeller blades. By stepping up the secondary voltage, smaller wires may be used. The use of smaller wires increases the fatigue life of the harness.

It should be noted that the transfer could also be used to transmit power and signals to rotor blades of a helicopter for deicing.

In another application, the transformer of the invention could be used to transmit signals if appropriate auxiliary secondary windings are used. This arrangement could replace the synchrophasing sensor presently used on propellers for multi-engine aircraft. Synchrophasing systems are used to adjust the phase angle between propellers of multi-engine aircraft to reduce cabin noise.

With reference now to FIG. 6, an alternate form of rotary transformer according to the present invention is generally designated with the numeral 150. The transformer 150 includes an outer cylindrical core 152 and an inner cylindrical core 154. For purposes of explanation only, it is assumed herein that the inner core serves as the rotating secondary core, and that the outer core serves as the stationary primary core. However, those skilled in the art will readily understand that this assumed configuration is strictly for convenience and ease of explanation, because clearly either core/winding can be the primary while the other core/winding serves as the secondary. Furthermore, either core can be rotated with respect to the other, although for higher speed operation it may be desirable to rotate the smaller diameter inner core only.

The inner or secondary core 154 is generally cylindrical in shape and includes a longitudinally extended body 156 that flares out at both ends to enlarged outer diameter ear-like axial extensions 158. Thus, when viewed in longitudinal section as in FIG. 3 the core has somewhat of a stretched omega shaped contour. The flared portions 160 are preferred to a sharp angled radial extension (as in FIG. 1 for example) to provide a more uniform flux density across the core because the core 154 will have a preferred flux direction. Thus, the flared portions 160 preferably include radius-type bends 162. An angle of thirty-one degrees (31°) has been found to be suitable for the flared portions, though this angle is not critical.

According to an important aspect of the invention, the cores 152, 154 are laminated structures, preferably having a plurality of thin laminations that extend along the centerline axis of rotation, $\mathbb{C}$, and are stacked radially outward from the rotation axis. Thus, the inner core has a preferred flux direction that is generally axial as represented by the $\Phi_s$ arrows in FIG. 6. It is apparent that the flux substantially remains within the core structure, of course, except where the flux crosses the gap to the other core. The preferred flux direction in the ear-like extensions 158 is also axial. However, the flared portions 160 will direct the flux with both an axial and radial directional component.

The laminations can be made of any suitable magnetically permeable material such as silicon iron, a nickel iron alloy such as alloy 49, stainless steel, or Vanadium Permendur, to name just a few. The particular material selected for the laminations will depend on such factors as the size and weight criteria the transformer must meet, as well as core losses allowable, permeability required, formability of the material, cost and the type of power transfer required from the primary to the secondary winding and the efficiency needed. The laminations can be made from concentrically formed rings or in a tape wound configuration. Other lamination techniques are certainly useable. For example, a six pound transformer capable of coupling from the primary to the secondary 300 to 500 watts from a 400 Hz source can be realized in an approximately two inch length by approximately nine inch to 10.5 inch diameter envelope using only a 0.056 in. thick core made of four silicon iron laminations each 0.014 in. thick. The laminations can be bonded together with Bondmaster® or other suitable adhesive.

A secondary winding or coil 164 is wrapped around the cylindrical body 156 between the flared portions 160. Lead wires 166 can be used to access the secondary winding after the transformer is fully assembled and preferably potted. For example, when the transformer 150 is used with a propeller deicing system, the secondary leads 166 are connected to the deicing system which acts as the output load for the transformer. In such an example, the load rotates with the secondary and the prop. The secondary winding, of course, is a multi-turn coil made from insulated wire as is known generally in the transformer art. Preferably, a thin insulating layer 168, such as Bondmaster® for example, is provided between the secondary winding 164 and the secondary core 154.

The primary core 152 is similar to the secondary core 154, except that the core body flares inwardly to the ear-like extensions to a reduced diameter cylindrical shape. Accordingly, the primary core includes a longitudinally extended body 180 that flares in at both ends to reduced outer diameter ear-like axial extensions 182. Thus when viewed in longitudinal section as in FIG. 6 the primary core 152 also has somewhat of a stretched omega shaped contour. Similar to the secondary core, the flared portions 184 are preferred to a sharp angled radial extension, to provide a more uniform flux density across the primary core. Thus, the flared portions 184 preferably include radius-type bends 186. As with the secondary core, an angle of thirty-one degrees (31°) has been found to be suitable for the flared portions 184. The primary core is also a laminated structure and thus has a preferred flux direction that is generally axial as represented by the arrow $\Phi_p$ in FIG. 6.

A primary winding or coil 188 is wrapped within the cylindrical body 180 between the flared portions 184. The primary winding 188 typically will include fewer turns of larger gauge wire than the secondary winding 164. Thus, the primary winding 188 can conveniently be formed on a mandrel and can hold its shape while being inserted into the interior of the primary core. The primary winding can be permanently held in place by potting compound or other suitable material when the transformer 150 is fully wound and assembled. Lead wires 190 can be used to access the secondary winding after the transformer is fully assembled and preferably potted. For example, when the transformer 150 is used with a propeller deicing system, the primary leads 190 are connected to the power source from the engine power plant, such as for example, a 10–100 kVA supply operating at 400 hertz. The primary winding, of course, is a multi-turn coil made from insulated wire as is known generally in the transformer art. Preferably, a thin insulating layer 192, which may conveniently be the same material as the layer 168, such as Bondmaster® for example, is provided between the primary winding 188 and the primary core 152.

The outer diameter of the secondary core extensions 158 is slightly and uniformly undersized with respect to the inner diameter of the primary core extensions 182 so as to fit concentrically therein. This arrangement provides a gap 194 between the cores and allows the secondary core and winding to freely spin or rotate within the primary core and winding on a common central longitudinal axis ℃. A typical gap for the exemplary transformer described herein would be approximately 0.050 in.

Another important aspect of the invention is the provision of the axial ear-like extensions 158, 182 on the secondary and primary cores respectively. These extensions serve several purposes, one of which is that they provide an enlarged airgap area for the flux to cross from the primary core to the secondary core. As will be apparent from FIG. 3, all the flux induced in the primary core 152 crosses over the gap 194 to the secondary core in a substantially radial direction. However, this radial direction is essentially orthogonal to the preferred flux direction of the laminated cores. Therefore, the axial extensions increase the gap while at the same time reduce the magnetizing currents in the primary.

Another significant benefit of the extensions 158, 182 is that they allow for axial displacement between the primary and secondary cores without a significant increase in primary excitation current or loss of power from the primary to the secondary. For example, when the secondary core is rotationally driven by an engine drive shaft, vibration and axial displacement of the shaft can cause the secondary core to shift axially with respect to the primary core. The ear-like extensions maintain an adequate gap therebetween to insure that the power transformation from the primary to the secondary will not be unacceptably degraded. In the exemplary transformer described herein, the extensions may have an axial length of about 0.195 in., as compared to the core thickness of only about 0.060 in. Thus, if the secondary core shifts 0.020 in. or so due to drive shaft displacement, a substantial airgap area between the extensions will still be present. On the other hand, if the extensions were not used, the axial length of the airgap would only be about 0.060 in. and a 0.020 in. shift could seriously affect operation of the transformer.

Still a further benefit of the extensions is that they help spread the flux density across a larger airgap thus reducing flux crowding which will tend to occur near the areas 196 where the flux will prefer to cross over the airgap 194.

Thus, completely contrary to conventional rotary transformer design, laminated cores can be used to achieve a small envelope lightweight high power rotary transformer. As shown in FIG. 7, the invention also contemplates an axial rotary transformer. In such a design, rather than having the cores concentrically arranged as in FIG. 3, the cores 152' and 154' are axially adjacent each other and separated by an airgap 194' between the extensions 158', 182'. The basic omega-shaped core contour is still preferred, similar to that illustrated in FIG. 6. The axial may be less preferred for some aircraft propeller deicing applications simply because axial displacement of the drive shaft can directly and significantly affect the airgap of the axial transformer.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. In combination, a rotary transformer and an aircraft deicing apparatus, associated therewith said transformer comprising:

a primary winding adjacent a laminated primary core, and a secondary winding adjacent a laminated secondary core;

said primary and secondary cores each comprising a generally cylindrical body formed of magnetically permeable material and being located with clearance therebetween to allow relative rotation between said cores on a common axis of rotation;

said primary core comprising a pair of spaced end portions and a span connecting said end portions to define an annular recess adapted to receive said primary winding, and said secondary core comprising a pair of spaced end portions and a span connecting said end portions to define an annular recess facing said recess of said primary core and adapted to receive said secondary winding, the thickness of each end portion of each of said cores being substantially greater than the thickness of the respective span.

2. The rotary transformer of claim 1 wherein said laminations are selected from the group consisting of silicon iron, vanadium permendur, nickel, iron alloy and magnetically permeable stainless steel.

3. The rotary transformer of claim 1 wherein one of said primary and secondary cores is an outer core and the other core is an inner core; said outer core having a larger diameter than said inner core so that said inner core axially fits inside said outer core with clearance therebetween to allow relative rotation between said inner and outer cores.

4. The rotary transformer of claim 3 wherein one of said cores is attachable to a rotating engine shaft.

5. The rotary transformer of claim 3 wherein each of said cores comprises a plurality of hoop-shaped laminations having channel-shaped radial crossections and including a pair of radial end flanges and an annular cylindrical wall extending between said end flanges, said hoop-shaped laminations being nested together with their respective cylindrical walls being closely adjacent to one another and with their respective radial end flanges axially spaced from one another; and a plurality of ring-shaped annular end laminations corresponding generally to said radial end flanges, at least one of said end laminations being located in the space between adjacent end flanges.

6. The rotary transformer of claim 1 wherein each of said cylindrical core bodies has cylindrical axial extensions on each end thereof with said clearance being defined by an airgap between said one core body extensions and said other core body extensions.

7. The rotary transformer of claim 6 wherein each of said axial extensions is integral with its respective core body by means of an axially flared body portion.

8. The rotary transformer of claim 3 wherein said inner core body has one of said windings wound thereon, and said outer core has the other of said windings wound about an inner periphery thereof.

9. The rotary transformer of claim 8 further comprising insulation between said windings and their respective cores.

10. The rotary transformer of claim 3 wherein said outer core is fixed with respect to a rotating drive means and said inner core is rotatable by said drive means with respect to said outer core.

11. The rotary transformer of claim 10 wherein said outer core winding functions as said primary winding and said inner core winding functions as said secondary winding.

12. The rotary transformer of claim 11 wherein said secondary winding is connectable to a deicing mechanism and said primary winding is connectable to an AC power source.

13. The rotary transformer of claim 12 wherein said deicing mechanism uses high power pulses coupled between said transformer primary and secondary windings.

14. In a rotary transformer of the type having a primary winding and a primary core, a secondary winding and a secondary core, the improvement wherein each of said cores is a generally cylindrical laminated structure formed of magnetically permeable material and said cores are arranged with an airgap therebetween, permitting relative rotation between the cores on a common axis of rotation, said primary core comprising a pair of spaced end portions and a span connecting said end portions to define an annular recess adapted to receive said primary winding, and said secondary core comprising a pair of spaced end portions and a span connecting said end portions to define an annular recess facing said recess of said primary core and adapted to receive said secondary winding, the thickness of each end portion of each of said cores being substantially greater than the thickness of the respective span.

15. A rotary transformer of claim 14 wherein each of said cores is generally cylindrical with different diameters such that there is an inner core and an outer core.

16. The rotary transformer of claim 15 wherein said each of said cores comprises multiple laminations of magnetically permeable material; said laminations having a preferred direction of flux that is generally parallel with said axis of rotation.

17. The rotary transformer of claim 14 wherein each of said cores comprises a plurality of hoop-shaped laminations having channel-shaped radial crossections and including a pair of radial end flanges and an annular cylindrical wall extending between said end flanges said hoop-shaped laminations being nested together with their respective cylindrical walls being closely adjacent to one another and with their respective radial end flanges axially spaced from one another; and a plurality of ring-shaped annular end laminations corresponding generally to said radial end flanges, at least one of said end laminations being located in the space between adjacent end flanges.

18. The rotary transformer of claim 15 wherein said inner and outer cores each include axial ear-like cylindrical extensions on each end thereof, said airgap being defined by a clearance between said inner and outer core extensions.

19. The rotary transformer of claim 16 wherein said laminated cores define a flux path for flux produced by current in the primary winding, said flux being carried in said preferred direction by said primary core to said secondary core across said airgap.

20. The rotary transformer of claim 19 wherein said flux path includes axial and radial directions of flux travel.

21. The rotary transformer of claim 19 wherein said flux crosses said airgap in a direction generally transverse said preferred direction.

22. The rotary transformer of claim 21 in combination with an aircraft deicing mechanism.

23. The combination of claim 22 wherein said secondary is rotationally driven by an aircraft engine.

24. The combination of claim 23 wherein said deicing mechanism uses high power electric pulses coupled between said primary and secondary windings.

25. The combination of claim 24 wherein said transformer pulses have a duty cycle greater than fifty percent.

26. The combination of claim 23 wherein said deicing system is an electro-mechanical system.

27. The combination of claim 23 wherein said deicing system is a thermal deicing system.

28. The combination of claim 23 wherein said deicing system is used to deice a propeller.

29. In combination with an aircraft deicing system of the type that uses electrical energy coupled between a stationary circuit and a high speed rotating circuit, the improvement comprising a rotary transformer for coupling the electrical energy between a primary winding and secondary winding thereof, with one of said windings rotating with said high speed rotating circuit, said transformer including a primary core, and a secondary core located with clearance therebetween to allow relative rotation said cores being formed of magnetically permeable material, said primary core comprising a pair of spaced end portions and a span connecting said end portions to define an annular recess adapted to receive said primary winding, and said secondary core comprising a pair of spaced end portions and a span connecting said end portions to define an annular recess facing said recess of said primary core and adapted to receive said secondary winding, the axial thickness of each end portion of each of said cores being substantially greater than the thickness of the respective span.

30. The combination of claim 29 wherein said transformer has laminated cores.

31. The combination of claim 29 wherein said transformer is a radial rotary transformer.

32. In a rotary transformer of the type having a primary winding and core, a secondary winding and core wherein the cores are formed of magnetically permeable material and are arranged with an airgap to permit relative rotation therebetween and define a flux path having axial and radial directional components, the improvement wherein:

said primary core comprises a pair of spaced end portions and a span connecting said end portions to define an annular recess adapted to receive said primary winding, and said secondary core comprises a pair of spaced end portions and a span connecting said end portions to define an annular recess facing said recess of said primary core and adapted to receive said secondary winding, said end portions defining an airgap between the cores to decrease the flux density in the airgap, the thickness of each end portion of each of said cores being substantially greater than the thickness of the respective span.

33. The rotary transformer of claim 32 wherein the transformer has a radial transformer configuration.

34. The rotary transformer of claim 32 wherein the transformer has an axial transformer configuration.

\* \* \* \* \*